United States Patent Office 2,752,168
Patented June 26, 1956

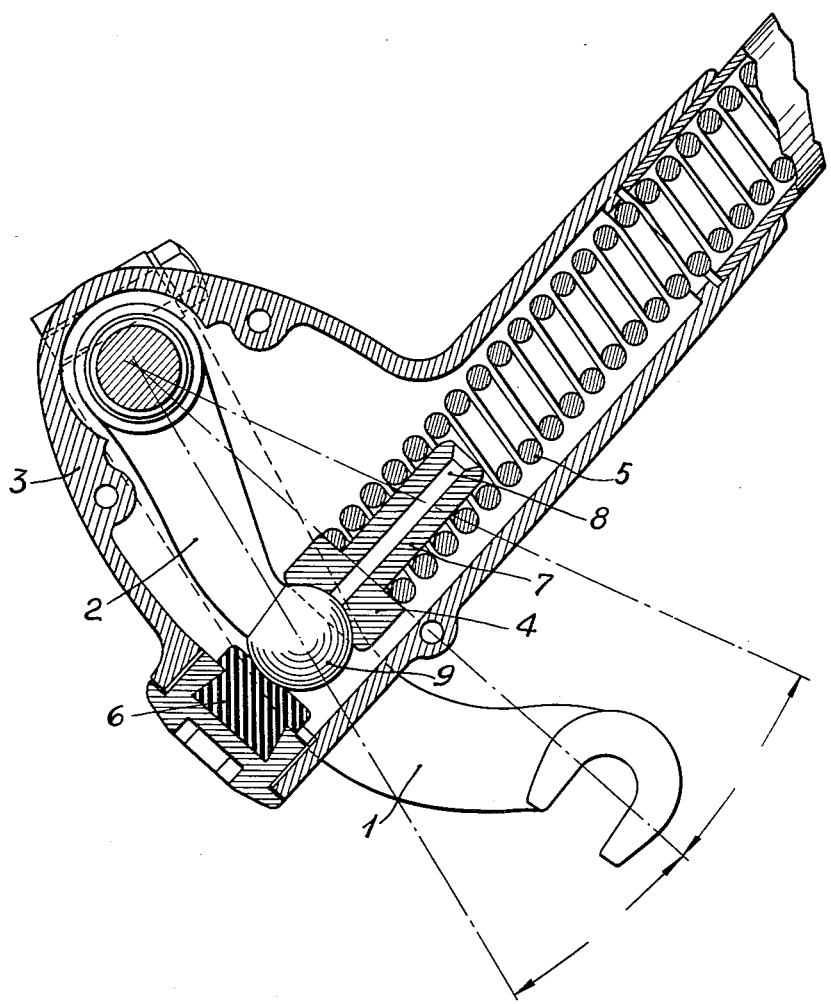

2,752,168
FRONT WHEEL SUSPENSION FOR MOTORCYCLES

Pier Luigi Torre, Milan, Italy

Application November 14, 1952, Serial No. 320,478

1 Claim. (Cl. 280—277)

The present invention relates to suspension of wheels of motorcycles and the like.

Several solutions are known of the oscillating arm suspension for the fore wheels of motorcycles.

In most cases, the reaction spring, preferably working under compression, is connected to the arm by means of an extension provided with a pin and a bushing, that, besides consenting the spring the various orientations of its end in conformity with the different positions of the arm, also constitutes a guide for the spring to the end of preventing its easy side swaying.

Another system sometimes resorted to—but much less correct—is that of screwing the spring over a suitably shaped appendage of the arm. With this solution the resulting side sways are such as to jeopardize the life of the spring.

With both of the above systems it is very difficult to install the entire spring unit in a housing not possessing excessive dimensions. The presence of journals requires the necessity of adequate lubrication organs, not always, however, assuring an efficient lubrication, as said pins and their bushings are easily attacked by mud spatterings and road dust creeping in between the parts moving relatively to one another.

The solution being the object of the present invention allows the installing within a moderately dimensioned and completely closed housing, of all of the suspension members, thus avoiding the necessity of having to lubricate special pins and bushings at the bearing of the spring over the arm. The only bushings required are those of the articulation of the arm.

The accompanying drawing illustrates diagrammatically and by way of example a practical embodiment of the invention.

To lever 1 is fixed to arm 2 located inside the housing completely filled with lubricant and rotating on two bushings carried respectively by housing 3 and by the cover closing the same. The end of arm 2 is ball-shaped. Upon this ball bears element 4 provided at one end with a spherical seat and at the other end with a stem 7 for guiding spring 5 disposed inside of the tube constituting one of the arms of the fork.

Element 4 is provided with an axial hole 8 for bringing the lubricant to the surfaces of the ball 9 and seat in contact. During the angular movement of arm 2, element 4 slides over the surface of the ball, and spring 5 is not submitted to bending. At the end of the return movement, arm 2 finds a rest upon the stop 6 made from a material possessing a certain resiliency, like rubber or cork.

In this way a suspension is obtained which is of simple construction and safe performance.

Naturally, all of the constructional details may be varied according to necessity without for this reason going out of the field of the present invention.

What I claim is:

A suspension for the front wheel of a motorcycle comprising a lubricant-tight housing completely filled with lubricant, a rotative lever externally of said housing for connection to the wheel, said lever being journaled in said housing, an arm within said housing secured to said lever and rotative therewith about the same axis of rotation of said lever, an end of said arm being ball shaped, said housing having an elongated portion, a spring in said portion, a co-axial member position in said spring and disposed at an end thereof and having a portion extending therefrom terminating in a spherical socket engaging the ball-shaped end of said arm, said spring engaging said coaxial member and pressing it into engagement with said end of said arm, said coaxial member having an elongated portion serving as an internal guide for said spring, said coaxial member being closed except for an unobstructed bore axially therethrough from end to end thereof for conducting lubricant to the engaged surfaces of said ball and said socket, including a resilient cushioning element in axial alignment with said spring and said co-axial member and disposed on the opposite side of said ball-shaped end for engagement thereby, a removal screw-threaded plug closing said housing, said resilient element being secured to said plug and removable therewith.

References Cited in the file of this patent

UNITED STATES PATENTS

| 1,543,364 | Breeze | June 23, 1925 |
| 2,183,129 | Binder et al. | Dec. 12, 1939 |

FOREIGN PATENTS

| 474,575 | Canada | June 19, 1951 |
| 621,233 | Germany | Nov. 4, 1935 |
| 646,446 | Germany | June 14, 1937 |